March 16, 1943. C. B. VAN ECK 2,314,320
WELDING GUN
Filed July 7, 1941 3 Sheets-Sheet 1

Inventor
CORNELIUS B. VAN ECK,

By Clarence A. O'Brien
Attorney

March 16, 1943. C. B. VAN ECK 2,314,320
WELDING GUN
Filed July 7, 1941 3 Sheets-Sheet 3

Inventor
CORNELIUS B. VAN ECK,
By Clarence A. O'Brien
Attorney

Patented Mar. 16, 1943

2,314,320

UNITED STATES PATENT OFFICE 2,314,320

WELDING GUN

Cornelius B. Van Eck, Grand Rapids, Mich., assignor to Progressive Welder Company, Detroit, Mich., a corporation of Michigan Application July 7, 1941, Serial No. 401,395

8 Claims. (Cl. 219—4)

The present invention relates to new and useful improvements in welding guns of, for example, the expanding contact type adapted for actuation by hydraulic pressure, and has for its primary object to provide a positive and efficient internal contact for the gun.

A further object is to provide an improved welding gun of simple and practical construction, which is reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which—

Figure 6 is a sectional view taken on a line 6—6 of Figure 2, and

Figure 1:
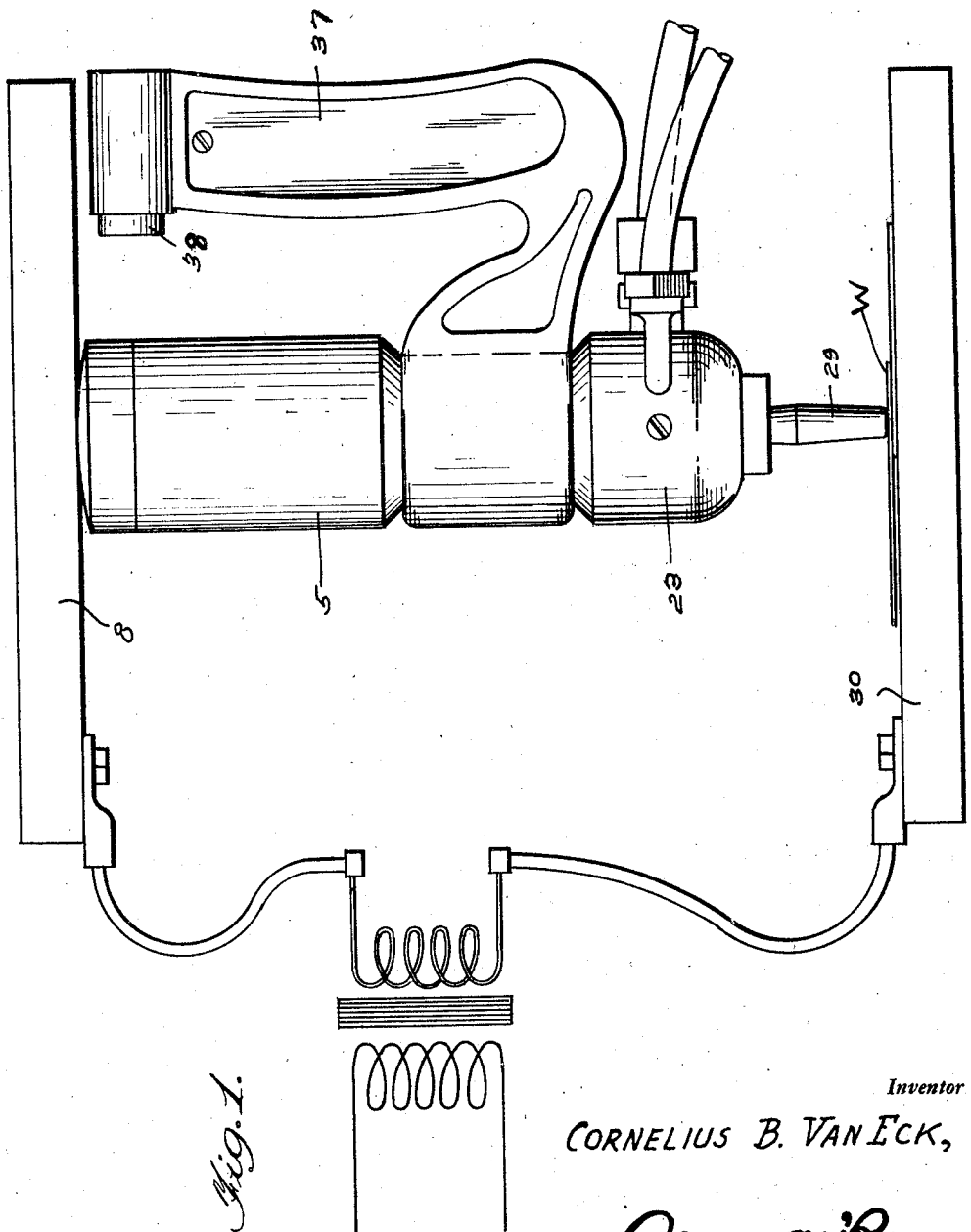
Figure 1 is a side elevational view.
Figure 2:
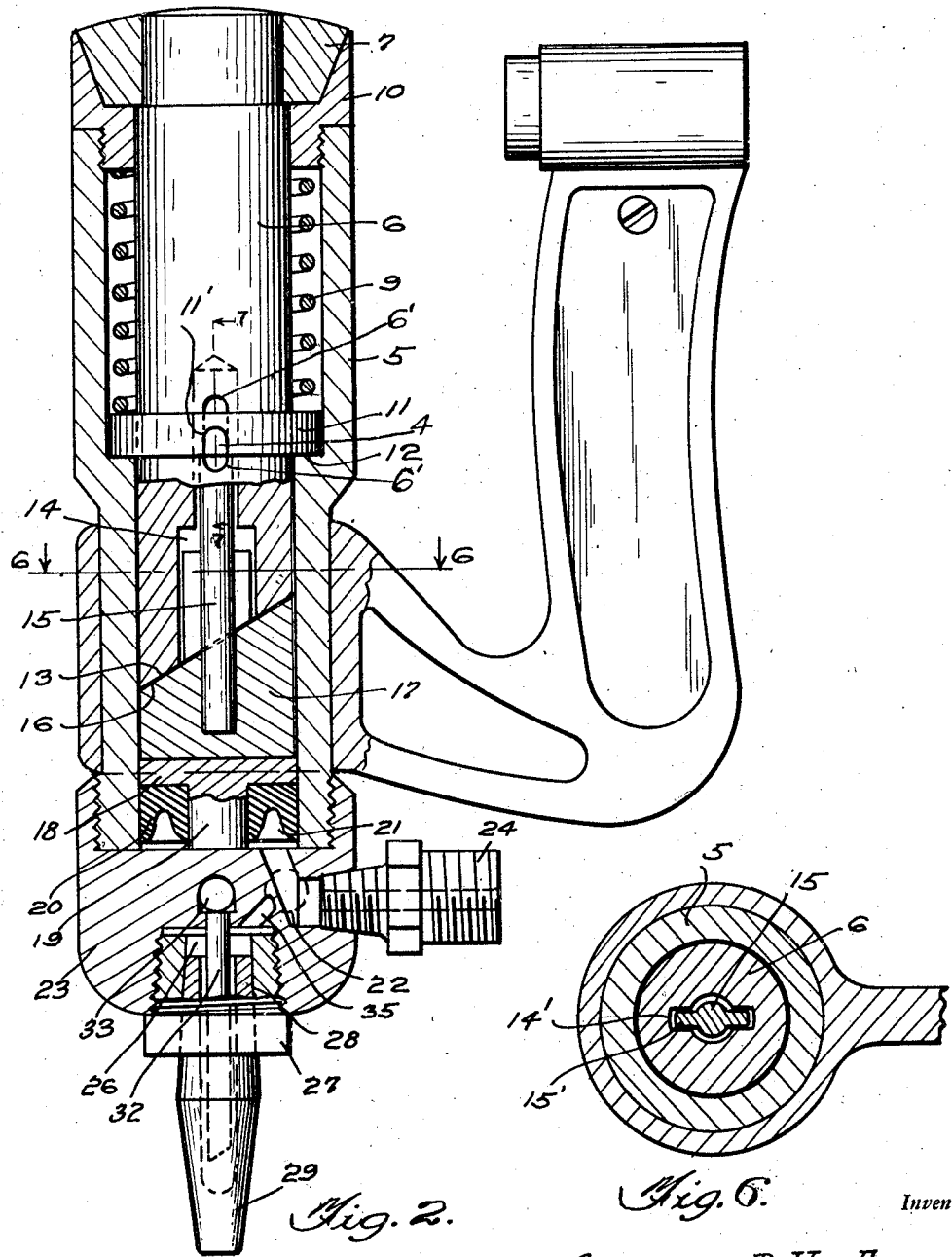
Figure 2 is a longitudinal sectional view through the gun.
Figure 3:
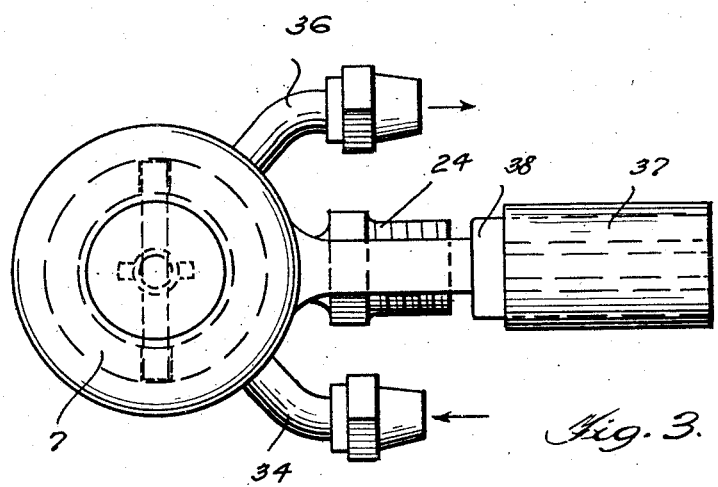
Figure 3 is a top plan view.
Figure 4:
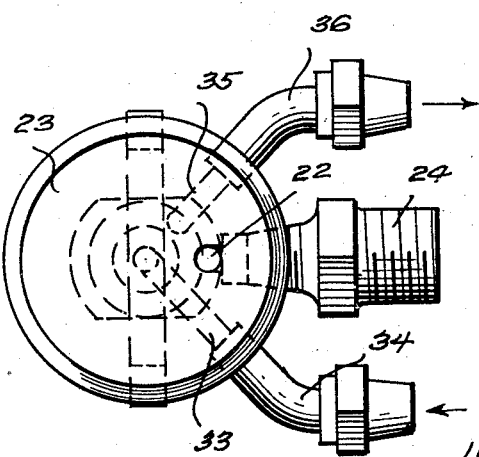
Figure 4 is a top plan view of the bottom cap removed from the gun and showing the oil connections.
Figure 5:
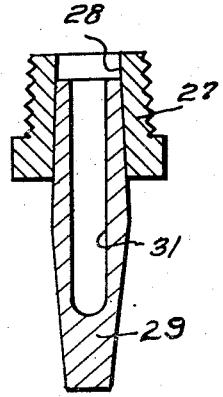
Figure 5 is a longitudinal sectional view of the lower welding point.
Figure 7:
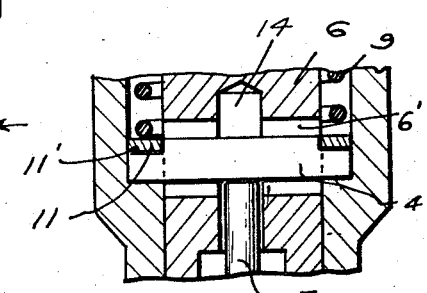
Figure 7 is a sectional view taken on a line 7—7 of Figure 2.

Referring now to the drawings in detail wherein for the purpose of illustration I have disclosed a preferred embodiment of my invention, the numeral 5 designates the cylinder, having the plunger 6 working therein and projecting outwardly at the top of the cylinder and provided with the head 7 for engaging the upper electrode 8.

The plunger is retracted by a coil spring 9 surrounding the plunger with the upper end of the spring bearing against a retaining ring 10 threaded in the cylinder and its lower end bearing against a washer 11. Washer 11 is freely mounted on the plunger 6 and abuts a shoulder 12 in the cylinder which reduces the diameter of the lower end of the cylinder.

The bottom of the plunger is provided with an inclined face 13 formed with an upwardly extending recess 14 for a guide pin 15 projecting upwardly from the correspondingly inclined upper face 16 of a wedging contact member 17 which is likewise slidably mounted in the lower end of the cylinder. The pin is loosely fitted in the recess to permit slight relative lateral movement between the plunger and contact and to provide clearance for the positive engagement of the contact and the plunger with the walls of the cylinder when pressure is applied to the under side of the contact.

The lower portion of the recess 14 is formed with lateral chambers 14' and the pin 15 is provided with lateral wings 15' at diametrically opposite sides loosely positioned in the chambers to maintain the inclined faces of the plunger and contact in a common plane and flatwise opposed to each other.

The plunger 6 is formed with a transverse slot 6' which communicates with the upper portion of the recess 14 and in which a key 4 is positioned. The key 4 is vertically movable to a limited extent in the slot 6', relative to the plunger 6, and has its ends seated in a notch 11' in the under side of the washer 11. The upper end of the pin 15 engages the key for raising the washer and compressing the spring during the upward movement of the contact 17. In turn the engagement between faces 13 and 16 enables the upward movement of contact 17 to cause corresponding movement of plunger 6.

Pressure is applied to the contact 17 by hydraulic pressure means which includes a piston 18 having a stem 19 on which a rubber packing ring 20 is positioned. Piston 18 may either freely abut or be a part of contact 17, and with the body 5 and cap 23, forms a pressure chamber 21. The chamber 21 communicates with a passage 22 in the lower cap 23, threaded on the cylinder, the passage having a nipple 24 connected thereto for attaching to an oil pressure line. The stem 19 abuts the upper face of the cap, when the parts occupy the illustrated position, and thus forms a limit to the retracting movements of the plunger and contact.

The bottom of the cap is also provided with a chamber 26 in which is threaded a hollow plug 27 provided with a tapering bore 28 slidably receiving a contact point adaptor 29 which projects from the plug for contact with the lower electrode 30. The adaptor 29 is provided with a recess 31 in which a tube 32 projects for connection with a passage 33 in the cap 23 and to which an inlet pipe 34 is attached leading to a water or other coolant supply line. An outlet passage 35 also communicates with the chamber 26 leading to a return pipe 36.

A handle 37 projects laterally and upwardly from the cylinder 5 and is provided with a push button control switch 38, which may, as will be understood, control the energization of the transformer.

The operation of the device may be briefly reviewed as follows: With pressure relieved from chamber 21, spring 9 causes washer 11 and pin 4 to seat against shoulder 12, thus occupying their lowermost positions. When so positioned, pin 4 bears against rod 15, which is thus effective to maintain contact 17 in its lowermost position, in which stem 19 bears against cap 23. The engagement between surfaces 13 and 16 affords a lower limit to movement of plunger 6, which member is, however, free to move upwardly a slight amount, since slot 6' is longer, vertically, than the vertical dimension of pin 4.

If pressure is applied to chamber 21, the resultant force of piston 21 forces contact 17 upwardly. The upward movement of contact 17 carries rod 15 upwardly, enabling it, through pin 4 and washer 11, to compress spring 9. The upward movement of contact 17 also causes, through the engagement of surfaces 13 and 16, a corresponding upward movement of plunger 6. When this movement of plunger 6 has progressed sufficiently to cause it to engage the bus bar 8 (Fig. 1), further vertical movement of plunger 6 is prevented. By virtue of the tapered faces 13 and 16, the continuing pressure in chamber 21, however, causes lateral forces to be applied to contact 17 and plunger 6, and in view of the fact that cylinder 5 is slightly larger than contact 17, contact 17 may be expected to move upwardly a very slight amount after plunger 6 engages bus bar 8.

This side pressure causes contact 17 and plunger 6 to solidly bear against the respectively opposite side walls of cylinder 5, thereby furnishing good electrical contact not only directly between contact 17 and plunger 6, but also between these members and cylinder 5. It is to be noted, from Fig. 1, that the welding circuit extends from bus bar 8, into plunger 6. From plunger 6, the current may be expected to divide, flowing partly directly into the wall of cylinder 5 and partly into contact 17. Any part of the current which passes through contact 17 flows therefrom into the wall of cylinder 5. As will be evident, cylinder 5 and cap 23 are electrically connected to the tip 29 which completes the circuit through the work W to the other bus bar 30. It is to be particularly noted that the side pressure of the plunger 6 and contact 17 against cylinder 5 is not developed until plunger 6 engages the work. This is for the reason that during the projecting movements of these members, the pressure of spring 9 is applied only against contact 17 and plunger 6 is thus retarded only by its own weight.

When pressure is relieved from chamber 21, spring 9 is effective, as aforesaid, to force collar 11, pin 4, rod 15 and, consequently, contact 17 to the retracted position. The downward movement of contact 17 enables plunger 6 to return downwardly under the influence of gravity. If plunger 6 does not follow contact 17, washer 11 and pin 4 downwardly, pin 4 engages the bottom of the slot 6' and enables spring 9 to positively force plunger 6 downwardly. During the return movement, however, there is no substantial pressure between contact 17 and plunger 6 and, consequently, the aforesaid side pressure is relieved. Thus, spring 9 may be made heavy enough to quickly effect the return movement against any back pressure in the line 24.

It will be appreciated that since the side pressure of members 6 and 17 is produced only when plunger 6 is pressed against the bar 8 by the pressure in chamber 21, and is relieved as soon as such pressure is relieved, the movements of members 6 and 17 in cylinder 5 produce little or no wearing of the engaging surfaces, thus materially increasing the life of the device.

Although only a single specific embodiment of the invention has been illustrated, it will be understood that various modifications thereof may be made without departing from the invention.

Having thus described my invention, what I claim as new is:

1. A welding gun comprising a cylinder, a plunger working in the cylinder and having a head projecting from one end of the cylinder, pressure means for projecting the plunger, a contact member interposed between the pressure means and the plunger, a floating connector between the plunger and said contact, and single spring means retracting the floating connector and the plunger.

2. A welding gun comprising a cylinder, a plunger working in the cylinder and having a head projecting from one end of the cylinder, pressure means for projecting the plunger, a contact member interposed between the pressure means and the plunger, said plunger and contact embodying a construction adapted to exert a lateral pressure both on the plunger and the contact for urging the same against the walls of the cylinder, a connector between the plunger and the contact having limited movement relative to the plunger, and spring means engaging the connector and urging the plunger, the connector and the contact into retracted position.

3. A welding gun comprising a cylinder, a plunger working in the cylinder and having a head at one end projecting outwardly of one end of the cylinder, fluid pressure means communicating with the other end of the cylinder for projecting the plunger, a constant member slidably mounted in the cylinder between the plunger and the fluid pressure means, inclined faces on the abutting ends of the plunger and contact adapted to urge both the plunger and the contact against the walls of the cylinder when pressure is applied, guide means between the plunger and contact to retain the same against relative rotation, said guide means having limited lateral and longitudinal movement relative to the plunger and spring means for retracting the plunger.

4. A welding gun comprising a cylinder, a plunger working in the cylinder and having a head projecting from one end of the cylinder, a pressure responsive contact in the cylinder, a floating connector between the contact and the plunger, spring means between the connector and the cylinder, said connector and spring means exerting a constant retracting influence on the contact and a delayed retracting movement on the plunger.

5. In a welder, a body, a part movable relative to the body from a retracted position to a position in which the welder is engaged with the work, yielding means for urging the part toward the retracted position, and actuating means for moving the part to bring the welder to the work engaging position and for relieving the part of the force of said yielding means during such movement.

6. In a welder, a body, an assembly movable along the body comprising a pair of interengageable parts, said assembly being movable relative to the body, by application of force to one part, from a retracted position to a position in which the welder is engaged with the work, said parts being arranged so that a pressure between the parts laterally presses at least one of the parts against the body, yielding means for urging the assembly toward the retracted position, and means for controlling the yielding means during movement of the assembly to the second position, so that no substantial said lateral pressure is developed until said second position is reached.

7. In a welder, a body, an assembly movable along the body comprising a pair of interengageable parts, said assembly being movable relative to the body, by application of force to one part, from a retracted position to a position in which the welder is engaged with the work, said parts being arranged so that a pressure between the parts laterally presses at least one of the parts against the body, said pressure being produced by the engagement of the welder with the work, means including yielding means acting against said one part for urging it toward the retracted position and enabling the other part to move to the retracted position, said means being forced to yield by said one part during its movement to the second position and being ineffective to substantially oppose movement of the other part to the second position.

8. The structure of claim 7, wherein the yielding means has a lost motion connection with the other part which renders it ineffective to oppose movement thereof to the second position.

CORNELIUS B. VAN ECK.

CERTIFICATE OF CORRECTION.

Patent No. 2,314,320. March 16, 1943.

CORNELIUS B. VAN ECK.

It is hereby certified that error appears in the printed specification of the above numbered patent requiring correction as follows: Page 2, second column, line 41, claim 3, for "constant" read --contact--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.